UNITED STATES PATENT OFFICE.

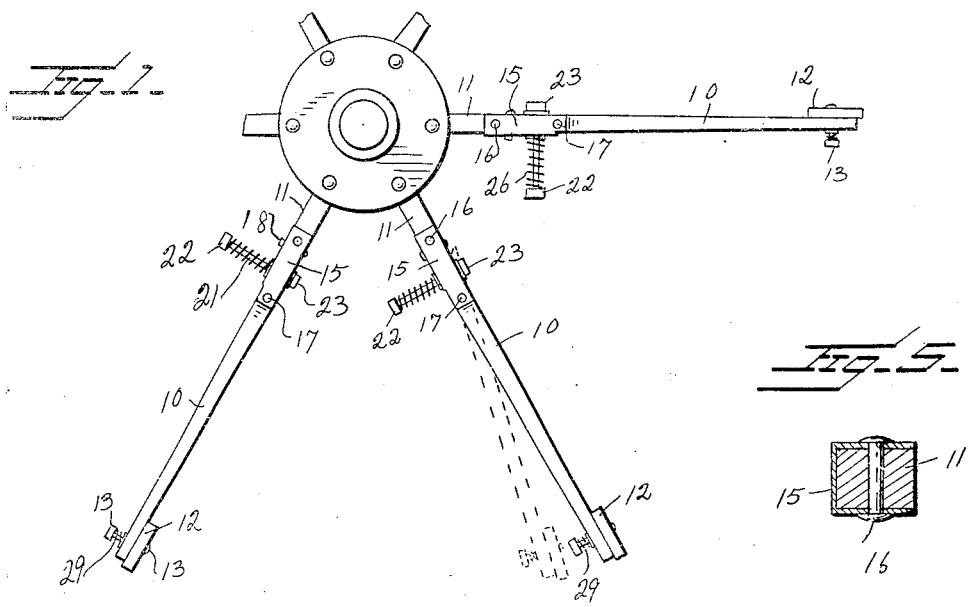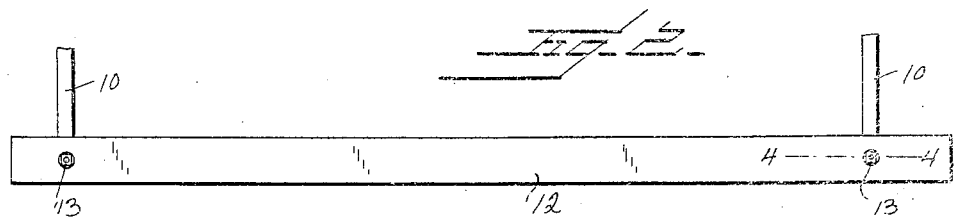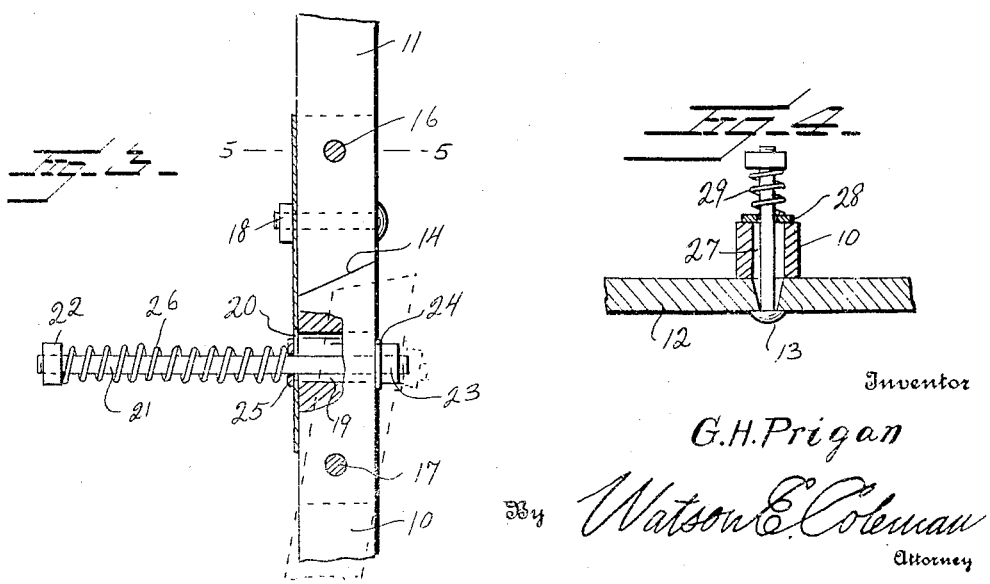

GUSTAVE H. PRIGAN, OF BURNS, MONTANA.

HARVESTER-REEL ARM.

1,336,536.   Specification of Letters Patent.   Patented Apr. 13, 1920.

Application filed March 12, 1919. Serial No. 282,073.

*To all whom it may concern:*

Be it known that I, GUSTAVE H. PRIGAN, a citizen of the United States, residing at Burns, in the county of Richland and State of Montana, have invented certain new and useful Improvements in Harvester-Reel Arms, of which the following is a specification, reference being had to the accompanying drawings.

This invention relates to arms forming part of harvester or header reels and like structures, and the general object of the invention is to provide an arm formed in two sections pivotally connected to each other and so constructed that the outer section may yield relative to the inner section in a direction reverse to the direction of movement of the reel so that if the cross rods of the reel or the ends of the arms strike a stone or like obstruction, they will not be broken, but will yield to pass over the obstruction.

In operating harvesters equipped with reels, it is a very common thing to have the reel arms broken by striking a stone, or where the reel is mounted upon a header and the header is moving over rough ground, to have the arms broken by a downward movement of the header, which will cause the reel to strike the ground. This is particularly true where short grain is being harvested, which requires that the reel shall be adjusted so as to sweep very close to the ground. As before stated, the general object of my invention is to do away with this disadvantageous construction by providing a reel, the two sections of each arm of which are resiliently held in alinement, but which will yield rearward when striking a stone or obstruction.

A further object is to improve the details of mechanism of this kind by placing a spring which holds the two sections of the reel arm in alinement on the rear face of the reel arm so that it will not come in contact with the ground and tend to tear the grain or become entangled in the same.

And a further object in this connection is to so form the abutting faces of the sections that grain will not become entangled or pinched between these abutting faces.

Other objects will appear in the course of the following description.

My invention is illustrated in the accompanying drawings, wherein:—

Figure 1 is a fragmentary end view of a harvester reel constructed in accordance with my invention;

Fig. 2 is a fragmentary face view of the outer ends of the arms;

Fig. 3 is a fragmentary detail view, partly in section, of the reel arm;

Fig. 4 is a section on the line 4—4 of Fig. 2; and

Fig. 5 is a section on the line 5—5 of Fig. 3.

Referring to these drawings, it will be seen that the reel arm is formed of wood and composed of two sections 10 and 11, the section 10 being relatively long in comparison with the section 11. I have illustrated the section 11 as being disposed adjacent the hub of the reel, while the section 10 carries the cross bars 12 forming the circumference of the reel, these bars 12 being held in place by bolts 13, but I do not wish to be limited to this, as it is obvious that the reverse may be the case. The two sections 10 and 11 have their abutting faces disposed at an inclination, as at 14, and splicing these sections 10 and 11 together is a metallic splicing member 15 which is U-shaped in cross section and made of thin metal. This embraces the two sections 10 and 11 very snugly and it is bolted or riveted, as at 16, to the section 11 and bolted or riveted, as at 17, to the section 10. This member is also bolted to the section 11 by a bolt 18 transverse to the bolt 16. Thus this splice bar 15, as it may be termed, is rigidly connected to the section 11 and pivotally connected to the section 10.

For the purpose of yieldingly holding the sections 10 and 11 in alinement, I slot the section 10, as at 19, and the splice bar, as at 20, and pass through this slot the bolt 21, one end of which carries a head 22. The other end carries a nut 23 which bears against a washer 24 disposed against the face of the section 10. Disposed between the head 22 of the bolt and washer 25 is a coiled expansion spring 26.

It will be obvious that this spring will hold the sections in alinement with each other, but if the section strikes a stone or obstruction, it may turn upon the pivot 17 against the tension of the spring 26, and thus ride over the obstruction. As soon as the obstruction has been passed, the spring 26 will draw the sections back into alinement with each other.

It will be noted that the side walls of the U-shaped splice bar will tend to prevent grain from getting into the space between the sections 10 and 11 when the latter are in angular relation to each other and that the inclined faces 14 will tend to crowd out any chance stalk of grain which might possibly tend to become pinched between these two abutting faces. Inasmuch as the spring 26 is on the rear face of the reel arm, it will not become entangled with any grain or tend to tear the grain up or strip the kernels from the grain.

It will be seen that my device is very simple and that it is thoroughly effective for the purpose intended. It will be noted that this construction permits the two reel arm sections to be disposed in such angular relation to each other that the reel arm will be about three inches shorter when the sections are in an angular relation than when they are in alinement. It is also to be noted that the tension of the spring may be adjusted by adjusting the nut 23. Thus the tension may be increased or decreased so that on a windy day or when working in heavy grain, the spring will be sufficiently light so that the arm will not throw the grain against the wind board of the harvester and make bad bundles, which is particularly the case where stiff reel arms are used. On headers operating in short grain, the reels have to be adjusted to their very lowest position, and in this case if the ground be rough, the jar of the machine will often jerk the reel down enough to break it. This requires time to repair, and this time may mean a loss where there is a great deal of grain to be cut, or where the grain is "shelling," or the machine may be operated without repairing the reel arm, which tends to leave a space between the reels, which is not properly reaped. My jointed reel arm obviates this trouble.

Of course, the reel arms at opposite ends of the reel are connected by transverse slats or bars 12, and it will be obvious that if a stone or other obstruction is disposed adjacent the path of movement of one set of reel arms, that is nearer one end of the reel than the other, that end of the reel will be subjected to more retardation than the opposite end of the reel and that there will be a certain amount of twisting strain applied to the reel. To compensate for this, I attach each slat 12 at its ends to the reel arms by means of a bolt 13. This bolt passes through a relatively elongated aperture 27 in the reel arm so as to permit the bolt to have a lateral movement within the aperture and relative to the reel arm, and between the nut on this bolt and washer 28 there is disposed a coiled compression spring 29. This connection not only permits the relative movement between the reel arms and the slats when an obstruction is struck, but also permits a certain amount of flexibility in the parts.

I claim:—

A reel for harvesters comprising a rigid section and a movable section, the sections having beveled abutting ends to hold the sections in alinement with each other and permit movement of the movable section in one direction, an elongated splicing member secured to and partially surrounding the rigid section and projecting beyond the beveled end thereof, said projecting portion of the splicing member pivotally supporting and partially surrounding the movable section and preventing the movable section from binding in its pivotal movement, said movable section having an opening, said splicing member having an opening registering with the first mentioned opening, a bolt carried by the movable section and extending through the registering openings and a spring disposed on the bolt between the splicing member and the free end of the bolt to resist movement of the beveled end of the movable section away from the splicing member and beveled end of the rigid section.

In testimony whereof I hereunto affix my signature in the presence of two witnesses.

GUST. H. PRIGAN.

Witnesses:
N. O. ANDERSON,
G. R. FIERO.